United States Patent [19]

VanderBilt et al.

[11] Patent Number: 4,753,728

[45] Date of Patent: Jun. 28, 1988

[54] WATER FILTER

[75] Inventors: Herbert J. VanderBilt, Lowell; Timothy D. Modert, Grand Rapids, both of Mich.

[73] Assignee: Amway Corporation, Ada, Mich.

[21] Appl. No.: 849,167

[22] Filed: Apr. 7, 1986

[51] Int. Cl.$^4$ .............................................. B01D 39/20
[52] U.S. Cl. ..................................... 210/282; 210/490; 210/506; 210/510.1
[58] Field of Search ............... 210/694, 807, 266, 282, 210/502.1, 504, 506, 510.1, 488–490

[56] References Cited

U.S. PATENT DOCUMENTS

| | | | |
|---|---|---|---|
| 3,250,397 | 5/1966 | Moltchan | 210/409 |
| 3,263,812 | 8/1966 | Hartley | 210/209 |
| 3,439,809 | 4/1960 | McPherren | 210/249 |
| 3,450,632 | 6/1969 | Olson et al. | 210/23 |
| 3,474,600 | 10/1969 | Tobias | 55/524 |
| 3,520,417 | 7/1970 | Durr et al. | 210/493 |
| 3,556,304 | 1/1971 | Collard | 210/489 |
| 3,595,399 | 7/1971 | Aboa | 210/266 |
| 3,950,251 | 4/1976 | Hiller | 210/232 |

Primary Examiner—Ivars Cintins
Attorney, Agent, or Firm—Price, Heneveld, Cooper, DeWitt & Litton

[57] ABSTRACT

The specification discloses a double shell filter comprising an inner shell of bounded 80 to 400 U.S. mesh screen carbon particles and an outer shell of bonded 20 to 80 mesh screen carbon particles wherein the inner and outer particles are bonded internally to each other and the two shells are bonded together preferably by an ultra high molecular weight polymer binder having a melt index of less than about 1 gram per ten minutes as determined by ASTM D1238 at 190 degrees C. and 15 kilograms load.

33 Claims, 1 Drawing Sheet

WATER FILTER

BACKGROUND OF THE INVENTION

The present invention relates to water filters. Typically, such filters comprise a hollow core cylindrical block of bonded, activated charcoal. Water flows through the perimeter of the charcoal filter and into the center core from whence it flows to the user. Typically, some type of porous plastic sleeve is located in the core to keep the charcoal from flaking off into the water.

One problem with such filters is that if the charcoal particles are fine enough to do a proper filtering job, they inhibit water flow substantially. One prior artisan has attempted to overcome this by cutting longitudinal grooves in the outer peripheral surface of the filter. However, it is believed that this merely causes water to flow through the filter at the base of the groove and effectively or substantially eliminates water flowing through an outer layer of the filter.

Another problem with bonded charcoal particle filters is that the plastic binder used to bond the charcoal particles together tends to clog the pores of the activated charcoal. While such clogging does not completely eliminate the effectiveness of the activated charcoal, it does tend to reduce its efficiency.

U.S. Pat. No. 3,950,251 discloses a cylindrical filter element formed of a polymer bonded, compressed charcoal inner core with a porosity of about 10 microns and a second outer filter element sleeve made up of unbonded granular activated charcoal of 14 to 40 mesh particle size. A serious problem with such an arrangement is that the outer sleeve of unbonded charcoal has to be contained in a porous plastic container to keep the charcoal from spilling out of the filter during shipping and storage.

Also, water tends to "channel" through the unbonded outer charcoal without being filtered. On the other hand, bonding can substantially limit the effective surface area of the larger particles, in that the binder clogs the pores. The effective surface area of the larger particles is already less per unit of weight than that of the smaller inner particles, and the binder aggravates the problem.

SUMMARY OF THE INVENTION

In the present invention, a satisfactory degree of filtration without undue inhibition of water flow is achieved by providing a cylindrical filter having an inner bonded 80 to 400 U.S. Mesh screen carbon particle shell, most preferably 80 to 325 U.S. mesh screen, and an outer shell of bonded 20 to 80 U.S. mesh screen and preferably 20 to 60 U.S. mesh screen carbon particles, which is also bonded to the inner charcoal shell so as to create an integral package. This filter is made in accordance with a unique process whereby a separator sleeve is placed into a filter mold, a mixture of the smaller carbon particles and binder is placed on the inside of the separator sleeve and a mixture of the larger charcoal particles and binder is placed on the outside of the separator sleeve. The separator sleeve is then removed and the mass is sintered and pressed to create a unitary carbon filter having two different particle size, integrally bonded layers.

In another aspect of the invention, the carbon particles are bonded together by means of a very low melt index polymer, which becomes tacky without becoming sufficiently liquid to substantially wet the carbon particle surface. Deleterious diminution of the effective carbon surface area is minimized. Further, this unique polymer binder, not heretofore suggested for use as such, facilitates binding layered masses of carbon particles, e.g. a two layer system, in that heating sufficiently to tackify and bond the innermost layer of particles can be achieved without wetting thoroughly the outer layer of particles.

These and other objects, advantages and features of the present invention will be more fully understood and appreciated by reference to the written specification and appended drawings.

DESCRIPTION OF THE PREFERRED EMBODIMENT

Figure 1:
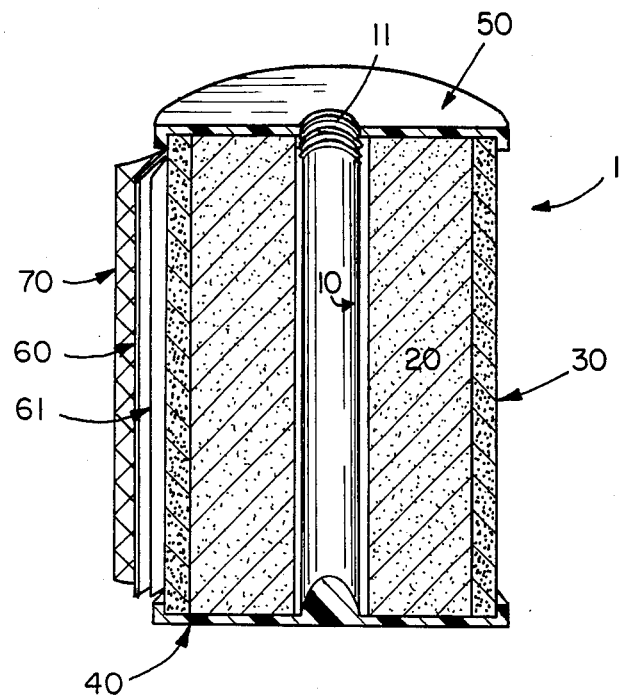
FIG. 1 is a vertical cross sectional view of a charcoal filter made in accordance with the preferred embodiment of this invention.

In the preferred embodiment, the filter 1 of the present invention comprises an inner porous plastic cylinder 10, an inner bonded carbon sleeve 20 around cylinder 10, an outer bonded carbon sleeve 30, a bottom end cap 40 and a top end cap 50 (FIG. 1). The outer charcoal layer 30 is covered by fabric 60 and fabric scrim 61, which are held in place by plastic net wrap 70.

Inner plastic sleeve 10 is a conventional porous plastic sleeve which allows water to flow readily through its cylindrical wall. It is threaded at one end 11 whereby the filter assembly 1 can be threaded onto a threaded member in a suitable filter housing. It has an outer diameter such that it fits snugly within inner carbon layer 20. It is from $\frac{3}{4}$ to $1\frac{1}{4}$ inch in diameter, and most preferably about 1 inch.

Inner carbon layer or sleeve 20 comprises 80 to 400 mesh U.S. Series screen powdered carbon, and most preferably 80 to 325 mesh powdered carbon. Activated carbons are produced and identified according to their mesh size. In an 80 to 325 mesh carbon, the particles are of a size such that 90 to 95 percent of the carbon will pass through an 80 mesh screen but remain on a 325 mesh screen. In contrast, 75 to 85 percent of an 80 to 400 mesh carbon will remain on a 325 mesh screen. All screen numbers used herein refer to U.S. Sieve series screens.

In many charcoals, screen size definition is somewhat difficult due to the presence of "fines." Such fines are extremely fine particles which will pass through any practical screen. These may comprise as much as 20% by weight of the charcoal and are disregarded by the charcoal producers themselves in grading their charcoals. The screen grading referred to herein also disregards the presence of fines.

Examples of commercially available 80 to 400 mesh carbon include:

| Barnebey Cheney TM | YF |
| Calgon TM | ADP |
| Calgon TM | GW |
| Calgon TM | PCBG |
| Calgon TM | PCB |
| Calgon TM | RB |
| Darco TM | S51 |
| Darco TM | S51 FF (fines removed) |

Commercial examples of the more preferred 80 to 325 mesh carbon include the following:

| | |
|---|---|
| Calgon TM | TOGC |
| Witcarb TM | 950 |
| Barnebey Cheney TM | 1006 |
| Calgon TM | TOG |

Of these, Calgon TM TOG is the most preferred.

Inner carbon cylinder 20 extends from the exterior of inner cylindrical sleeve 10 outwardly to an outside diameter of from about 3 to 4 inches, with 3½ inches being preferred. When bonded and pressed as described below, inner carbon layer 20 has a porosity of about 0.2 microns.

Outer carbon cylinder 30 begins at the exterior of inner cylinder 20 and extends outwardly to an outside diameter from about 4 to about 5 inches, with 4⅜ inches being preferred. Outer carbon cylinder 30 is comprised of 20 to 80 mesh carbon, and most preferably 20 to 60 mesh carbon. Examples of commercially available carbon within this range include:

| | | |
|---|---|---|
| Calgon TM | TOGX | (20 to 50 mesh screen) |
| Darco TM | SG | (20 by 60) |

The preferred binder in accordance with the present invention comprises a polymeric material with a very low melt index (melt flow rate) which becomes tacky at elevated temperatures without becoming sufficiently liquid to significantly wet the carbon particle surface. The melt flow rate or melt index as determined by ASTM D1238 or DIN 53735 at 190 degrees C. and 15 kilograms. load should be less than about 1 gram/10 minutes, more preferably less than 0.5 grams/10 minutes and most preferably less than 0.1 gram/10 minutes. A most preferred binder is an ultra high molecular weight, high density polyethylene. The high molecular weight gives rise to the restricted flow properties of the melted material which is so important to this aspect of the invention. An example of a commercially available ultra high molecular weight, high density polyethylene is Hostalen ® GUR-212. It has a density of 0.935 grams per cubic centimeter and a melt index of less than 0.1 grams per ten minutes as determined by DIN 53735 at 190/15. Such polyethylenes have a molecular weight of from about 4 to about 6 million. They have a vicat softening point of approximately 74 degrees centigrade and a crystalline melting range of 135 to 138 degrees C.

The temperature at which the most preferred binder becomes sufficiently tacky to adhere to the carbon particles may vary depending on the specific polymer used. With the high molecular weight, high density polyethylene, we find that the binder and carbon particles can be processed at a temperature of from about 175 degrees C. to about 205 degrees C. for about 2 hours.

The percentage of the preferred binder used to bind the inner layer is from about 17 to about 25 percent, and most preferably about 20 percent by weight based on the combined weight of the carbon and binder. For the outer layer, from about 20 to about 30 percent by weight binder is used in the binder/carbon composition, and most preferably about 25 percent. One must use enough binder to hold the carbon particles together, but avoid using so much as to block the surface pores of the carbon particles.

The binder must be utilized in powder form so that it can be uniformly mixed and dispersed with the carbon particles. The use of the preferred embodiment polymer binder allows one to bind the carbon particles together in both layers without excessively wetting the carbon particles when melted and thereby effectively occluding much of the surface area of the carbon particles. The preferability of using an ultra high molecular weight, low melt index polymeric material to a conventional polymeric binder is established by reference to Table I, containing examples 1 through 18, below. As can be seen by reference to Table I, the percentage of available carbon is 50 to 100 percent greater or more than when conventional polymer binders are used.

Of course, as regards that aspect of the present invention which broadly involves using carbon particles of two different size ranges, conventional binders can be employed. These are typically polyethylenes having much higher melt indexes. The percentage of binder used tends to run higher in these formulations, e.g., as high as 35 percent. Such binders are usually polyethylene or polyethylene copolymer materials having molecular weights substantially lower than 4 to 6 million.

Figure 2:
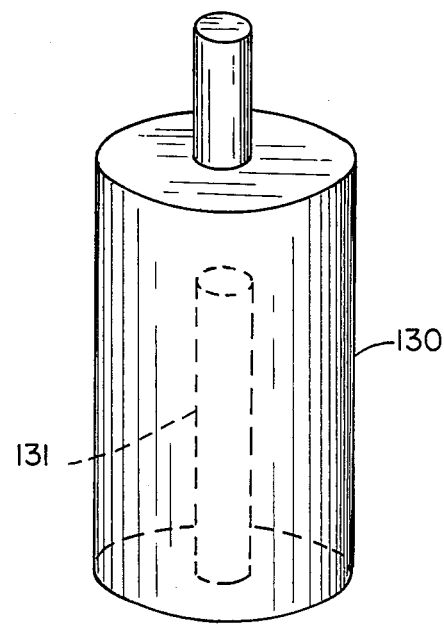
FIG. 2 is a perspective partially broken view showing the apparatus for making the filter.
Figure 2:
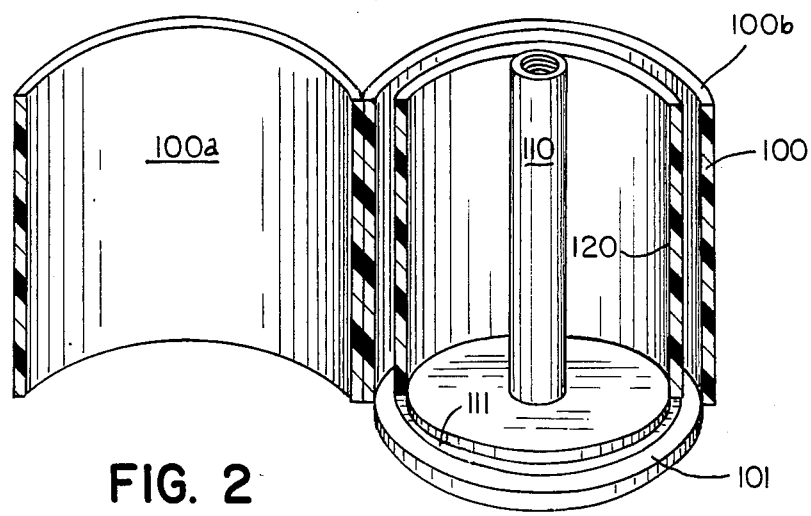

The process for making the assembly comprising inner sleeve 10, inner carbon cylinder 20 and outer carbon cylinder 30 involves the use of a hinged cylindrical shaped molding cup 100 having an upwardly projecting central dowel 110 (FIG. 2). A separator sleeve 120 is placed in mold 100 and is located in a groove 111 in the bottom 101 of mold cup 100. Separator sleeve 120 is approximately ⅛ of an inch thick and can be made of paper, glass, metal or any other like material.

Once separator sleeve 120 is in place, the inner layer carbon is blended with binder and loaded into the space between inner sleeve 10 and separator 120. A special funnel having a mass flow hopper is used in order to keep the carbon particles from separating during the filling operation. Such funnels have sides sloped at 80 degrees, rather than the usual 60 degrees.

Hinged half 100a of mold cup 100 is closed on half 100b and the two halves clamped together by suitable clamping means (not shown). (It is not essential that mold 100 be hinged, and in production it will not be hinged). Then, the outer layer carbon is blended with binder and loaded into the space between separator sleeve 120 and the outer cylindrical wall of mold cup 100.

With all of the carbon and binder blend in place, separator sleeve 120 is removed from mold cup 100. Mold cup 100 and its contents are then heated to from about 175 to about 205 degrees centigrade. Simultaneously, the carbon/binder blends are subjected to from about 30 to about 120 p.s.i. pressure via pressure piston 130 which is lowered into mold cup 100 and which includes a central clearance opening 131 for inner dowel 110.

Compression piston 130 has approximately the diameter of inner charcoal cylinder 20. This is because compression is required primarily for the smaller inner carbon particles and binder. If piston 130 were the diameter of both layers 20 and 30 combined, inner layer 20 would not compress adequately. While some of the outer charcoal particles and binder get forced up around the outside of piston 130 during compression, the "sleeve" thus formed is trimmed off during the later trim operation.

The carbon/binder layers are then allowed to cool and the composite structure is removed from mold 100.

The binder creates an integrated structure in which the inner carbon layer 20 is bonded to itself, outer carbon layer 30 is bonded to itself, and both layers are bonded to each other, thereby creating a unitized structure.

This composite is then trimmed at both ends to create smooth, firm ends. Porous plastic sleeve 10 is inserted into the inner cylinder in inner layer 20 left by dowel 110. The composite filter is then dipped into melted polyproplene in a slush mold to form bottom cap 40 (FIG. 1). Top cap 50 is formed in the same way, except that the top cap slush mold includes a threaded member onto which the threaded end 11 of inner plastic sleeve 10 is threaded so that polypropylene forms around the top end 11 of sleeve 10 and does not get into it and block it as is the case with bottom cap 40.

melt index for the binders is indicated in the fourth column.

The iodine number is a number expressing the quantity of iodine absorbed by a substance. The sixth column in Table I expresses the iodine number for the raw carbon. The seventh column expresses the iodine number for the carbon in its bound form, i.e. in a filter block. In each case, the filter block was first produced in accordance with the process described above, and then a portion thereof was ground up for purposes of determining its iodine number. Conventional sodium thiosulfate titration techniques were used to determine the iodine number in each case. The percentage of available carbon is the bound carbon iodine number divided by the raw carbon iodine number multiplied by 100.

TABLE I

| Example | Carbon | Binder | Melt Index g/10 min | % Binder | Raw Carbon Iodine No. | Bound Carbon Iodine No. | % Avail Carbon |
|---|---|---|---|---|---|---|---|
| 1 | Barnebey ™ 1003 | Microthene ™ FN510 | 5 | 25% | 850 | 450 | 53% |
| 2 | Barnebey ™ 1003 | GUR212 | <.1 | 40% | 850 | 654 | 77% |
| 3 | Barnebey ™ YF | Microthene ™ FN510 | 5 | 20% | 1050 | 390 | 37% |
| 4 | Barnebey ™ YF | GUR212 | <.1 | 20% | 1050 | 805 | 77% |
| 5 | Witcarb ™ 950 | Microthene ™ FN510 | 5 | 35% | 1210 | 713 | 59% |
| 6 | Witcarb ™ 950 | GUR212 | <.1 | 35% | 1210 | 1108 | 92% |
| 7 | Darco ™ S51 | Polyslip ™ 101 | * | 35% | 600 | 100 | 17% |
| 8 | Darco ™ S51 | Polyslip ™ 105 | * | 35% | 600 | 100 | 17% |
| 9 | Darco ™ S51 | Hercoflat ™ 135 | * | 35% | 600 | 297 | 50% |
| 10 | Darco ™ S51 | Microthene ™ FA113 | * | 35% | 600 | 187 | 31% |
| 11 | Darco ™ S51 | GUR212 | <.1 | 35% | 600 | 413 | 69% |
| 12 | Witcarb ™ 940 | GUR212 | <.1 | 20% | 1000 | 1042 | 104% |
| 13 | Witcarb ™ 940 | GUR212 | <.1 | 20% | 1000 | 961 | 96% |
| 14 | Witcarb ™ 940 | GUR212 | <.1 | 20% | 1000 | 862 | 86% |
| 15 | Witcarb ™ 950 | GUR212 | <.1 | 35% | 1210 | 1000 | 83% |
| 16 | Witcarb ™ 950 | GUR212 | <.1 | 35% | 1210 | 1108 | 92% |
| 17 | Witcarb ™ 950 | GUR212 | <.1 | 20% | 1210 | 1084 | 90% |
| 18 | Witcarb ™ 950 | GUR212 | <.1 | 20% | 1210 | 1060 | 88% |

*Precise melt index not known, but in each case it was relatively high and certainly greater than 1 gram/10 minutes.

The resulting composite is then wrapped with a layer of nonwoven scrim 61 and a somewhat thicker nonwoven fabric having an effective porosity of 25–35 microns and a thickness of about ⅛ of an inch. These layers are held in place by a final plastic net 70 which is wrapped around fabric 60 as is conventional.

EXAMPLES

The desirability of using a high molecular weight, low melt index polymer as a binder is illustrated in examples 1 through 18 reported in Table I. In each example, a filter block was made using the indicated carbon and the indicated binder at the indicated percentage. The degree to which carbon is available in each case to absorb impurities is indicated in the column labeled "percent available carbon". This was determined by comparing the iodine number for the raw carbon to the iodine number for the bound carbon. The Naturally, the raw carbon iodine number is different for each type of charcoal. However in each and every case, the percentage of available carbon is substantially greater where the binder used is an ultra high molecular weight, low melt index polymer. The ultra high molecular weight, low melt index polymer used in examples 2, 4, 6, 11 and 12–18 was the Hostalen ® GUR212 discussed above. The other materials are conventional polymer binders of the type typically used to bind carbon particles in water purifiers and the like or for other purposes.

The filter blocks of examples 1 and 2 are both made using a Barnebey Cheney ™ carbon, No. 1003. In example 1 wherein 25% of a conventional polyethylene binder was used, the percent available carbon was only 53%. When 40% of an ultra high molecular weight, low melt index polymer was used, the available carbon was 77%. Hence, the available carbon was 50% greater, even though the percentage of binder used was over 50% greater.

In examples 3 and 4, yet another carbon was used. The conventional binder at 20% resulted in 37% available carbon, while the preferred embodiment binder at 20% yielded 77% available carbon. Similar results are obtained in examples 5 and 6.

In examples 7-11, yet another type of carbon is used. In examples 7-10, a wider variety of conventional polymer binders is employed. The percent available carbon varies from 17% to 50%. When the same carbon material is used with an ultra high molecular weight in example 11, low melt index polymer, the available carbon is 69%.

Examples 12-18 illustrate that the superior results obtained using an ultra high molecular weight, low melt index polymer as a binder are reliably repeatably obtained. In example 12, the results suggest that the available carbon actually increases. While this may indicate some type of synergistic result, it may also be the result of routine experimental variation and simply a reflection of the fact that a very high percentage available carbon can be obtained using an ultra high molecular weight, low melt index binder.

Table II includes examples 19-24 which illustrate the superior flow rate obtained using a twin shell construction in accordance with the present invention. The carbons used for the inner and outer (if any) filter layers are indicated, as are the percent binders for the respective layers. Flow rate is indicated next. The effectiveness of the filter is reflected in the column headed "Percent Removal Rated Life." The rated life of the filter is 500 gallons. The impurity used is chloroform at a level of 250 parts per billion. The percent removal figure indicates the percentage of added chloroform which was removed from the 500 gallons of water after it had passed through the filter. The hardness of each filter was determined using a penetrometer with a 150 gram load. The figure indicated is the depth of penetration of the needle in tenths of millimeters. In each case, the hardness of the filter block is acceptable.

weight, low melt index polymer of the present invention was used as a binder for both the inner and outer carbon layers. The flow rate of the filter block increased to one gallon per minute as distinguished from 0.6 to 0.8 gallons per minute. Yet, the percent removal over the rated life of the filter block did not suffer and the hardness was still acceptable.

In examples 23 and 24, a filter block made using only a layer of Darco TM S51, an 80 to 400 mesh carbon material, was compared to a filter block made using an inner layer of the same carbon and an outer layer of Darco TM SG, a 20 to 60 mesh carbon. The binder used in examples 23 and 24 was not the preferred ultra high molecular weight, low melt index binder, but rather a conventional polyethylene binder sold commercially under the trademark MICROTHENE TM FN510. MICROTHENE TM FN510 is a polyethylene binder having a density of 0.924 and a melt index of five grams per ten minutes as determined by ASTM D 1238. It has a vicat softening temperature of 97 degrees C.

In example 23 where only a single shell of bound carbon is used, the flow rate is only 0.76 gallons per minute. By using the twin shell approach of the present invention (example 24), the flow rate was increased to 0.83 gallons per minute.

The embodiments of the invention in which an exclusive property or privilege is claimed are defined as follows:

1. A carbon particle filter comprising carbon particles bonded into a filter block by a low melt index polymeric material having a melt index of less than about 1 gram per 10 minutes as determined by ASTM D 1238 at 190 degrees C. and 15 kilograms load, whereby said polymeric material will tackify at elevated temperatures without becoming sufficiently liquid to substantially wet the carbon particles.

2. The carbon particle filter of claim 1 in which said melt index is less than 0.5 grams per 10 minutes.

3. The carbon particle filter of claim 2 wherein said polymeric material comprises an ultra high molecular weight polymer having a molecular weight of from about 4 to about 6 million.

TABLE II

| Example | Carbon Inner Or Single | Carbon Outer | Binder Inner & % | Binder Outer & % | Flow Rate | % Removal Rated Life | Hardness |
|---|---|---|---|---|---|---|---|
| 19 | TOG | — | 20% GUR212 | — | .6 | 97 | 14.8 |
| 20 | TOG | — | 25% GUR212 | — | .7 | 99 | 13.5 |
| 21 | TOG | — | 20% GUR212 | — | .8 | 98 | 17.5 |
| 22 | TOG | TOGX | 20% GUR212 | 25% GUR212 | 1.0 | 99 | 17.0 |
| 23 | Darco TM S51 | — | 35% Microthene FN510 | — | .76 | No Data | 11.7 |
| 24 | Darco TM S51 | SG | 35% Microthene TM FN510 | 25% Microthene TM FN510 | .83 | No Data | 13 |

In examples 19-21, a filter is made using a single shell of Calgon TM TOG carbon. That carbon has a particle size distribution of 80 to 325 mesh. An ultra high molecular weight, low melt index polymer was used as a binder. The water flow rate reported is 0.6, 0.7 and 0.8 gallons per minute respectively for each of the examples As can be seen by comparing example 22 to examples 19-21.

As can be seen by comparing example 22 to examples 19-21, significantly improved flow rate can be obtained by using a twin shell construction in accordance with the present invention. The outer shell used in example 22 is made of Calgon TM TOGX, a 20 to 50 mesh carbon material. The preferred ultra high molecular 4. The carbon particle filter of claim 1 wherein said polymeric material comprises an ultra high molecular weight polymer having a molecular weight of from about 4 to about 6 million.

5. The carbon particle filter of claim 4 wherein said polymeric material is polyethylene.

6. The carbon particle filter of claim 1 wherein said polymeric material is polyethylene.

7. The carbon particle filter of claim 1 in which said melt index is less than 0.1 gram per 10 minutes.

8. The carbon particle filter of claim 7 wherein said polymeric material comprises an ultra high molecular weight polymer having a molecular weight of from about 4 to about 6 million.

9. The carbon particle filter of claim 7 wherein said polymeric material is polyethylene.

10. A carbon particle filter comprising:
an inner shell of bonded 80 to 400 U.S. Series mesh screen carbon particles bonded to each other;
an outer shell of bonded 20 to 80 U.S. Series mesh screen carbon particles bonded to each other and to said inner shell whereby a unitized, integral double shell carbon filter is obtained which will allow water to pass more fully than a comparably sized single shell bonded filter of 80 to 400 U.S. Series mesh screen carbon particles without significantly adversely affecting the removal qualities of the filter.

11. The filter of claim 10, in which said inner shell is comprised of 80 to 325 mesh carbon particles and said outer shell is comprised of 20 to 60 mesh carbon particles.

12. The filter of claim 11 in which said carbon particles in said inner and outer shells are bonded together by a low melt index polymer material which will tackify at elevated temperatures without becoming sufficiently liquid to substantially wet the carbon particles.

13. The filter of claim 12 in which said binder has a melt index of less than about 0.1 gram per ten minutes as determined by ASTM D 1238 at 190 degrees C. and 15 kilograms load.

14. The filter of claim 13 in which said binder has a melt index of less than about 0.5 grams per ten minutes.

15. The filter of claim 14 in which said melt index is less than about 0.1 gram per ten minutes.

16. The filter of claim 15 in which said polymer binder comprises an ultra high molecular weight polyethylene having a molecular weight of from about 4 to 6 million.

17. The filter of claim 13 in which said polymer binder comprises an ultra high molecular weight polyethylene having a molecular weight of from about 4 to 6 million.

18. The filter of claim 12 in which said polymer binder comprises an ultra high molecular weight polyethylene having a molecular weight of from about 4 to 6 million.

19. The filter of claim 10, which includes an inner porous sleeve through which water will pass, said sleeve having a diameter of from one-half to one and one-half inches;
said inner shell fitting around said sleeve and having an exterior diameter of three to four inches;
said outer shell fitting around said inner shell and having an outside diameter of four to five inches.

20. The filter of claim 19 in which said carbon particles in said inner and outer shells are bonded together by a low melt index polymer material which will tackify at elevated temperatures without becoming sufficiently liquid to substantially wet the carbon particles.

21. The filter of claim 20 in which said binder has a melt index of less than about 0.1 gram per ten minutes as determined by ASTM D 1238 at 190 degrees C. and 15 kilograms load.

22. The filter of claim 21 in which said binder has a melt index of less than about 0.5 grams per ten minutes.

23. The filter of claim 22 in which said melt index is less than about 0.1 gram per ten minutes.

24. The filter of claim 23 in which said polymer binder comprises an ultra high molecular weight polyethylene having a molecular weight of from about 4 to 6 million.

25. The filter of claim 21 in which said polymer binder comprises an ultra high molecular weight polyethylene having a molecular weight of from about 4 to 6 million.

26. The filter of claim 20 in which said polymer binder comprises an ultra high molecular weight polyethylene having a molecular weight of from about 4 to 6 million.

27. The filter of claim 10 in which said carbon particles in said inner and outer shells are bonded together by a low melt index polymer material which will tackify at elevated temperatures without becoming sufficiently liquid to substantially wet the carbon particles.

28. The filter of claim 27 in which said binder has a melt index of less than about 0.1 gram per ten minutes as determined by ASTM D 1238 at 190 degrees C. and 15 kilograms load.

29. The filter of claim 28 in which said binder has a melt index of less than about 0.5 grams per ten minutes.

30. The filter of claim 29 in which said melt index is less than about 0.1 gram per ten minutes.

31. The filter of claim 30 in which said polymer binder comprises an ultra high molecular weight polyethylene having a molecular weight of from about 4 to 6 million.

32. The filter of claim 29 in which said polymer binder comprises an ultra high molecular weight polyethylene having a molecular weight of from about 4 to 6 million.

33. The filter of claim 28 in which said polymer binder comprises an ultra high molecular weight polyethylene having a molecular weight of from about 4 to 6 million.

* * * * *

UNITED STATES PATENT AND TRADEMARK OFFICE
CERTIFICATE OF CORRECTION

PATENT NO. : 4,753,728
DATED : June 28, 1988
INVENTOR(S) : Herbert J. VanderBilt and Timothy D. Modert It is certified that error appears in the above-identified patent and that said Letters Patent is hereby corrected as shown below:

In the Abstract, line 3:

Delete "bounded" and insert --bonded--.

Column 1, line 50:

Delete "U.S. Mesh" and insert --U.S. mesh--.

Column 7, Table II, example 23, lines 51 and 52:

Delete "Microthene FN510" and insert --Microthene™ FN510--.

Column 7, line 61:

Delete "As can be seen by comparing example 22 to examples".

UNITED STATES PATENT AND TRADEMARK OFFICE
CERTIFICATE OF CORRECTION

PATENT NO. : 4,753,728

DATED : June 28, 1988

INVENTOR(S) : Herbert J. VanderBilt and Timothy D. Modert

It is certified that error appears in the above-identified patent and that said Letters Patent is hereby corrected as shown below:

Column 8, line 39:

Delete "claim 2" and insert --claim 1--.

Signed and Sealed this

Fourteenth Day of November, 1989

*Attest:*

JEFFREY M. SAMUELS

*Attesting Officer*     *Acting Commissioner of Patents and Trademarks*